United States Patent [19]

Tanger et al.

[11] Patent Number: 5,734,832
[45] Date of Patent: Mar. 31, 1998

[54] METHOD FOR EVALUATING PERFORMANCE-FEATURE-RELATED MESSAGES IN A PROGRAM-CONTROLLED COMMUNICATION EQUIPMENT

[75] Inventors: Erwin Tanger, Delbrueck; Holger Steinbach; Wilfried Ahrens, both of Paderborn, all of Germany

[73] Assignee: Siemens Aktiengesellschaft, Munich, Germany

[21] Appl. No.: 713,355

[22] Filed: Sep. 13, 1996

[30] Foreign Application Priority Data

Sep. 15, 1995 [DE]  Germany .................. 195 34 317.4

[51] Int. Cl.$^6$ ........................................ G06F 13/00
[52] U.S. Cl. ........................................ 395/200.54
[58] Field of Search ................... 395/200.54, 200.57, 395/200.58; 370/399; 379/15, 112, 165

[56] References Cited

U.S. PATENT DOCUMENTS

| | | | |
|---|---|---|---|
| 5,323,383 | 6/1994 | Satoh | 370/399 |
| 5,448,631 | 9/1995 | Cain | 379/201 |
| 5,539,884 | 7/1996 | Robrock et al. | 395/200.57 |
| 5,579,309 | 11/1996 | Totzke | 395/200.54 |

FOREIGN PATENT DOCUMENTS

| | | |
|---|---|---|
| 0576864 | 1/1994 | European Pat. Off. |
| 0576864 A2 | 5/1994 | European Pat. Off. |
| 44 20 886 A1 | 12/1995 | Germany |
| WO 94/29993 | 12/1994 | WIPO |

OTHER PUBLICATIONS

Proceedings International Switching Symposium, paper B12, vol. 2, No. 23, Apr. 23–28, 1995, N. Fritsche, "Basic Call Processing Architecture For Flexible Control Of Supplementary Services", pp. 137–141.

IEEE Communications Magazine, vol. 31, No. 8, Aug. 1993, Y. Wakahara et al, "A Method for Detecting Service Interactions", pp. 32–37.

IEEE Communications Magazine, vol. 31, No. 8, Aug. 1993, E. Kuisch et al, "A Practical Approach to Service Interactions", pp. 24–31.

*Primary Examiner*—Ellis B. Ramirez
*Attorney, Agent, or Firm*—Hill, Steadman & Simpson

[57] ABSTRACT

In the method, the evaluation of messages for performance feature control is independent of the position, plurality and sequences of performance feature control elements. This is enabled in that the performance feature control elements are embedded in sequences in a message, and the performance feature control is implemented using a processing sequence that has flexibly allocatable processing routines and that takes the type of performance feature control element into consideration.

20 Claims, 3 Drawing Sheets

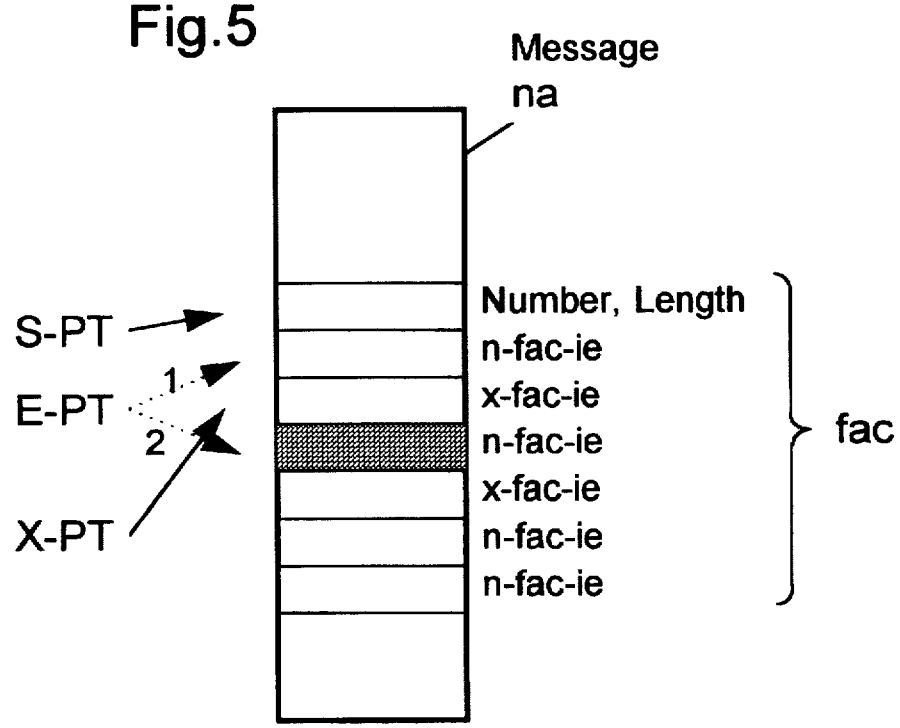

METHOD FOR EVALUATING PERFORMANCE-FEATURE-RELATED MESSAGES IN A PROGRAM-CONTROLLED COMMUNICATION EQUIPMENT

BACKGROUND OF THE INVENTION

Program-controlled communication equipment, particularly switching equipment, serve the purpose of switching communication terminal equipment within a communication network. Each connection between communication terminal equipment can have specific performance features available to it. These performance features relate both to the setup of a communication connection, for example, a connection request that alters the switching-oriented status of the communication equipment, as well as performance features that configure specific added functions for an existing call. For example, displaying the calling communication terminal equipment, call waiting or call forwarding.

The communication equipment is usually program-controlled and usually comprises at least one switching unit and a periphery controller with appertaining peripheral assemblies, whereby both the switching unit as well as the periphery controller have respective control units and memories. Connections via the signalling of performance features is also implemented exist between the switching unit and the periphery controller as well as further units.

This signalling is realized within performance-feature-related messages. Such performance-feature-related messages arrive at the periphery controller both from the communication terminal equipment as well as from the communication network and are transmitted to the switching unit. The performance-feature-related messages must be interpreted in the switching unit in order to be able to forward this signalling for conversion of the requested performance feature controllers.

The momentary switching-oriented status of the communication equipment (i.e. what connections exist and what switching-oriented resources are utilized for their realization) must be taken into consideration in the conversion of the performance feature controller. Among other things, this leads to the fact that specific performance feature control elements can only be transmitted in specific performance-feature-related messages. It must be additionally observed that the switching unit must trigger different processing events on the same performance feature control element dependent on the current switching-oriented status. In order to convert this status-modifying switching-oriented performance feature controller, specific performance feature control elements are only transmitted in pre-defined performance-feature-related messages. Dependent on the switching-oriented status of the switching unit, each performance-feature-related message is investigated for the presence of information, i.e. performance feature control elements, according to a permanently prescribed algorithm.

European Patent EP 0 576 864 A2 discloses a call processing system that assigns performance features a priority and undertakes the processing according to the priority given the presence of a plurality of performance feature modifications to be implemented. The current switching-oriented status of the system and whether the corresponding performance feature modifies the switching-oriented status, however, are left out of consideration. The switching-oriented status of a program-controlled communication equipment with reference to a call indicates the progress of the set up or clear down of the call (basic call).

SUMMARY OF THE INVENTION

It is an object of the present invention to provide an evaluation method for performance-feature-related messages that is independent of the position, plurality and sequence of performance feature control elements and the performance-feature-related message comprising them. In general terms the present invention is a method for evaluating performance-feature related messages to be processed within program-controlled communication equipment. The performance-feature-related messages are capable of having a selectable plurality of performance feature control elements embedded in performance feature control sequence. The performance-feature-related messages are searched for performance feature control sequences. The sequence of evaluating the embedded performance feature control elements is determined after the locating of performance feature control sequences such that a distinction is made between elements that modify the switching-oriented status of the communication equipment controlling the performance features and elements that leave the switching-oriented status unmodified. Processing routines respectively allocated to the performance feature control elements in groups are implemented according to this distinction for the control of performance features.

The present invention is also a program structure within program-controlled communication equipment for the evaluation of performance-feature-related messages. The performance-feature-related messages are capable of having a selectable plurality of performance feature control elements embedded in performance feature control sequences. An evaluation sub-program structure searches the performance-feature-related messages for performance feature control sequences and determines the sequence of the further-processing of performance feature control elements that are found. An executive sub-program structure for calling processing routines allocated to the performance feature control elements for the control of performance features.

A flexible processing can be prepared by embedding performance feature control elements into performance feature control sequences. The plurality of performance feature control elements that are transmitted in a performance-feature-related message is thereby freely selectable. In addition to having the performance feature control sequences, the performance-feature-related messages can also have further information, i.e. they merely form a group of messages via which performance feature control sequences can be transmitted. These performance-feature-related messages are investigated for performance feature control sequences, and the sequence of evaluating the embedded performance feature control elements is determined when they are found. Problems of considering the switching-oriented status of the communication system are avoided in that the performance feature control elements are categorized and further-processed by groups.

The independence of the evaluation method from the position, plurality and sequence of performance feature control elements within the performance feature control sequence is achieved by this determination of the sequence. Corresponding to the idea processing routine allocated to the performance feature control element is respectively determined and implemented for the control of performance features.

According to an advantageous development of the inventive method, the allocation of the processing routines to the corresponding performance feature control elements ensues via an allocation table. A reallocation of the performance feature controller or an expansion is significantly simplified by the allocation table. The allocated processing routines can be redesigned completely independently of the performance feature control elements. A new or expanded allocation of processing routines to performance feature control elements can also ensue during operations on the basis of a simple replacement of the allocation table.

When only one performance feature control element that modifies the switching-oriented status is taken into consideration per performance-feature-related message and the other are ignored, a plurality of performance feature control elements that modify the status and potentially contradict one another do not have any negative effect on the operational dependability of the communication equipment.

According to a further advantageous development of the inventive method, the one performance feature control element modifying the switching-oriented status is processed as last of the performance feature control elements of a performance-feature-related message. This means that the potentially existing performance feature control elements that do not modify the switching-oriented status of the communication equipment are processed first and relate to the defined switching-oriented status existing upon reception of the performance-feature-related message.

It also proves advantageous to distinguish the performance feature control elements on the basis of their operation code and to undertake the determination of the sequence of the evaluation of the performance feature control elements with the assistance of pointers. The operation code is a datum that indicates a specific command to be implemented or a command sequence.

The evaluation of the performance-feature-related messages can be initiated upon reception of the messages in a switching unit. Additionally, the evaluation method can be triggered after the reception of the messages by a periphery controller. However, the implemented processing routines for the control of the performance features will thereby differ.

The present invention is also an inventive program structure for the evaluation of the performance-feature-related messages within a program-controlled communication equipment.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIG. 5 depicts the functioning of pointers for the determination of the sequence of the evaluation of performance feature control elements.

DESCRIPTION OF THE PREFERRED EMBODIMENTS

Figure 1:
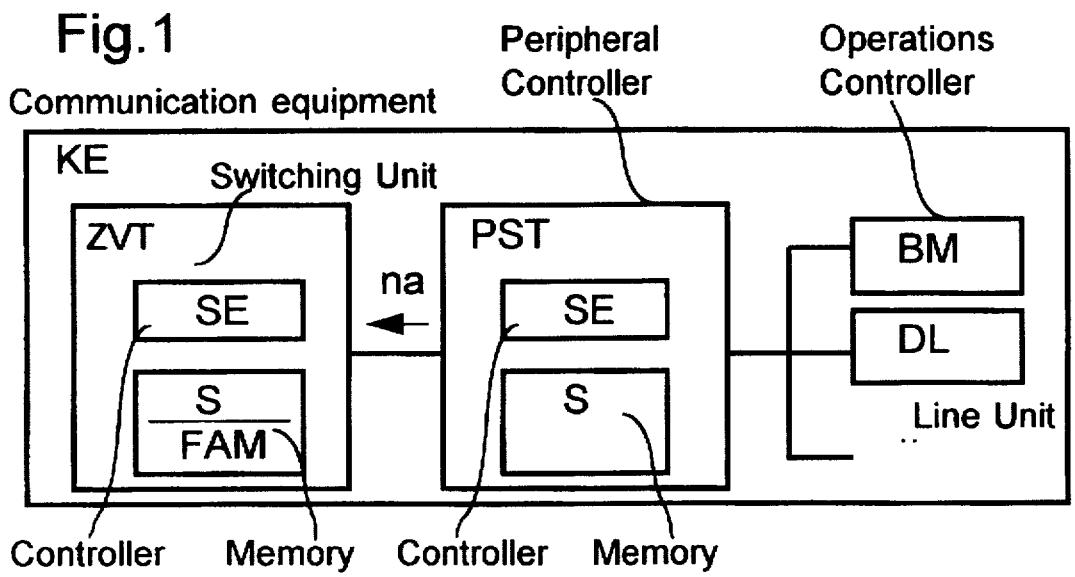
FIG. 1 is a block circuit diagram of the circuit-oriented structure of a program-controlled communication equipment.

FIG. 1 shows a program-controlled communication equipment KE with reference to which the inventive method of the evaluation of performance-feature-related messages na received in a switching unit ZVT is illustrated. The relevant elements of the circuit technology of the communication equipment KE are the switching unit ZVT that is connected to a periphery controller PST. The periphery controller thereby represents the connecting link to operations control means BM and line units DL.

Both the switching unit ZVT as well as the periphery controller PST contain a control means SE and at least one memory S. The performance-feature-related messages na are communicated from the periphery controller PST to the switching unit ZVT and are evaluated by the latter. A program structure FAM is stored in the memory S of the switching unit ZVT for the evaluation of these performance-feature-related messages na.

The program-controlled communication equipment KE is viewed disassociated from the communication network and from the subscriber lines to the communication terminal equipment units. Let it also be assumed that the performance feature control elements fac-ie provided for the performance feature control are embedded into a performance feature control sequence fac and are part of the performance-feature-related message na. This performance-feature-related message na can be alternatively formed in the periphery controller PST or received by the latter and forwarded unmodified.

Figure 2:
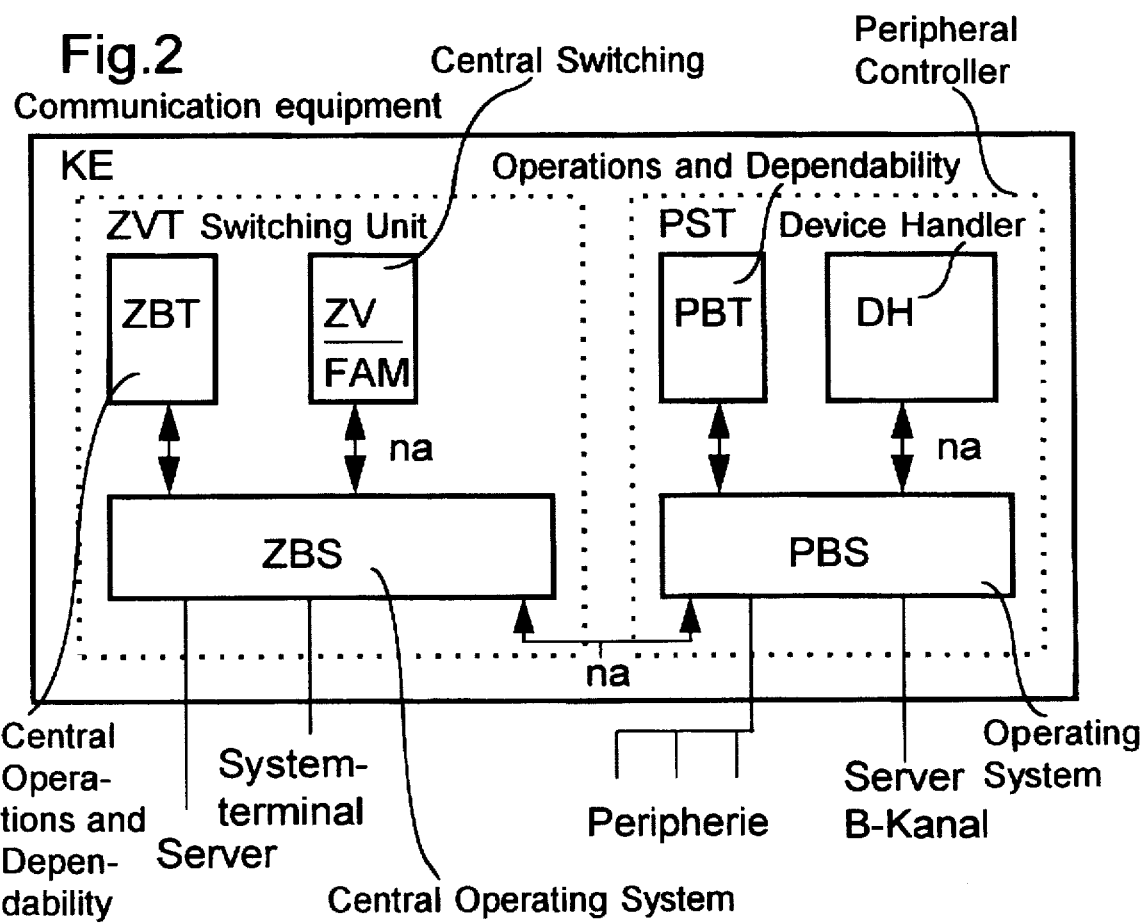
FIG. 2 is a block circuit diagram of a program structure of the critical units within a program-controlled communication equipment.

The global program structure of the program-controlled communication equipment KE shown in FIG. 2 shall be explained in greater detail with reference to block circuit diagrams only for the switching unit ZVT and the periphery controller PST.

The program structure of the switching unit ZVT has programs for the central operations and dependability technology ZBT, for the central switching technology ZV and for a central operating 25 system ZBS. The central operations and dependability technology ZBT makes general system functions available. Among other things, it assumes system functions such as data protection, configuration, system run-up, loading technology, clock synchronization and outage monitoring.

The central switching technology ZV controls the call setup and cleardown as well as the handling of performance features, the latter with the collaboration of the program structure FAM for processing performance-feature-related messages na. The following jobs, for example, are carried out by the central switching technology ZV: plausibility checks of the periphery messages, monitoring the logical condition of connections, administering and allocating operating means, evaluation of dialed numerals, acquisition of call data, communication with external computers.

The central operating system ZBS forms the interface between the circuit-oriented components of the program-controlled communication equipment KE and the system programs. It assumes the memory management, the process administration and the drive of external interfaces for the connection of peripheral equipment such as, for example, a system terminal and a server, and also enables the information transfer from and to the periphery controller PST.

At the side of the periphery controller PST, which has programs for the operations and dependability technology PBT of the periphery controller PST, for the control of the periphery assemblies (device handler) DH and for the operating system PBS of the periphery controller PST, the operating system PBS of the periphery controller PST assumes the reception and the transmission of information from and to the switching unit ZVT. For example, these information comprise the performance-feature-related messages na.

The operating and dependability technology PBT of the periphery controller PST makes general system functions available and assumes the loading of the periphery assemblies, the editing and protection of device data, the subscriber administration, the error handling and further functions in conjunction with the connected periphery assemblies.

A device handler DH is the connecting element between the switching technology and the interface to the periphery assemblies. It can thus accept programs for the control of analog connections, for the control of ISDN layer-3 protocols and/or other periphery assembly complexes.

The operating system BPS of the periphery controller PST forms the interface between the circuit technology and the operating programs such as device handler DH and operating system BPS of the periphery controller PST. The operating system BPS assumes the initialization of the periphery controller PST, the memory management, the offering of services, the servicing of the external interfaces and more. Servers and B-channels can be connected.

After the reception of a performance-feature-related message na communicated by the device handler DH of the periphery controller PST, this message is evaluated by the program structure FAM in the central switching technology ZV. It is likewise possible to arrange a program structure FAM for the evaluation of performance-feature-related messages na in a device handler DH and to realize at least a part of the performance features there.

Figure 4:
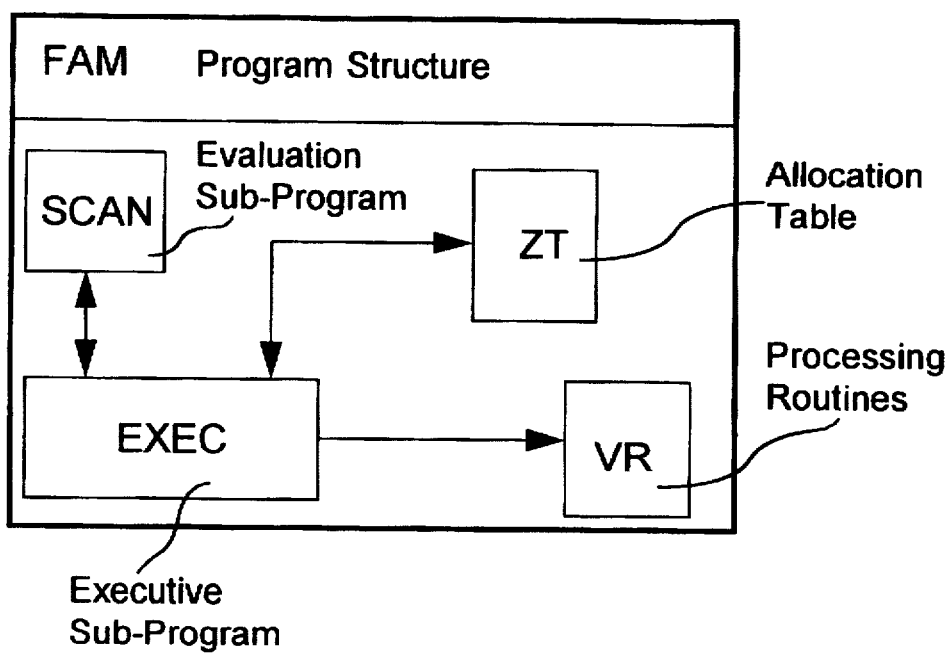
FIG. 4 is a schematic illustration of the sub-program structures of an inventive program structure for the evaluation of performance-feature-related messages.

The program structure FAM for the evaluation of performance-feature-related messages na is schematically shown in FIG. 4.

It comprises at least one evaluation sub-program structure SCAN for searching the performance-feature-related messages na for performance feature control sequences fac and for the determination of the sequence of the further processing of performance feature control elements fac-ie that have been found and has an executive sub-program EXEC for calling processing routines VR allocated to the performance feature control elements fac-ie for the control of performance features. The program structure FAM also includes an allocation table ZT that effects the correspondence between performance feature control elements fac-ie and processing routines VR, and processing routines VR for performance feature control elements fac-ie.

Figure 3:
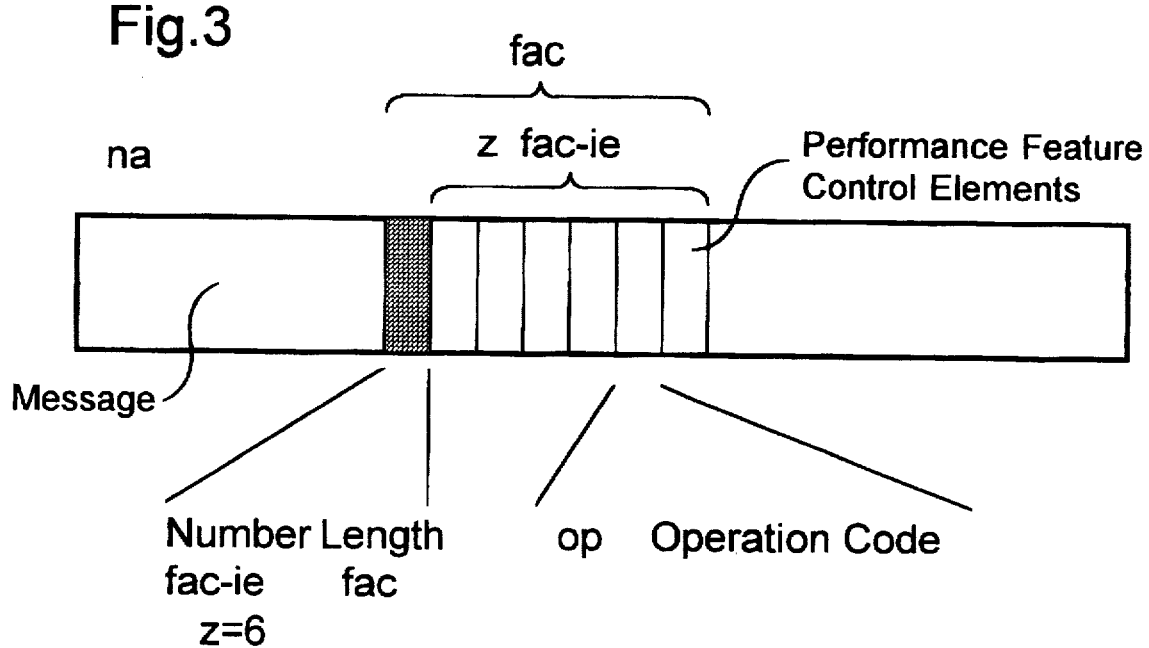
FIG. 3 depicts a performance-feature-related message with the performance feature control elements embedded in a performance feature control sequence.

FIG. 3 shows the structure of a performance-feature-related message na to be evaluated by way of example. In addition to having, for example, z performance feature control elements fac-ie (z being equal to six performance feature control elements in this case), a performance feature control sequence fac has a header that indicates the plurality of performance feature control elements fac-ie and the length of the sequence fac. Each of the performance feature control elements fac-ie contains an operation code op, a particular about the element length and parameters. The intended control of the performance features and, thus, the performance feature control elements fac-ie are distinguished on the basis of the operation code op.

The performance feature control elements fac-ie are divided into two categories on the basis of the operation code, into elements x-fac-ie that modify the switching-oriented status of the communication equipment KE controlling the performance features and into elements n-fac-ie that leave this status unmodified.

The performance feature control elements fac-ie are not categorically processed according to their sequence in the performance feature sequence fac; they are further-processed in groups according to the categorization.

The determination of the sequence of the further processing of the performance feature control elements fac-ie becomes clearer on the basis of the illustration of the pointer structure in FIG. 5. The structure of the performance-feature-related message na was taken from FIG. 3. However, it is not the header of the performance feature sequence fac but the performance feature control element present for further processing at the moment that is emphasized.

A sequence pointer S-PT is set to the beginning of a performance feature control sequence fac, i.e. to particulars about the plurality of performance feature control elements fac-ie and the length of the sequence fac. At the beginning of the evaluation (indicated by 1), an element pointer E-PT resides on the first performance feature control element fac-ie, for example an element n-fac-ie that does not modify the switching-oriented status of the communication equipment KE.

This element n-fac-ie is evaluated according to its operation code op, and the allocated processing routine VR is identified using the assistance of the allocation table ZT and is forwarded by the evaluation sub-program structure SCAN to the executive sub-program structure EXEC for calling the processing routine VR. After the implementation of the processing routine VR, the element pointer E-PT is set to the next performance feature control element fac-ie.

According to FIG. 5, for example, this is an element x-fac-ie that modifies the status and that should be further-processed only at the end of the performance feature processing sequence. To that end, a further pointer X-PT is set to this first status-modifying element x-fac-ie within the performance feature control sequence fac.

The following element n-fac-ie to which the element pointer E-PT is set in position 2 is thus processed as second performance feature control element. A further status-modifying element x-fac-ie is ignored. The two-fold appearance of a status-modifying performance feature control element x-fac-ie is not provided. It thus indicates an error and is appropriately handled by ignoring the second element x-fac-ie.

Subsequently, all further performance feature control elements n-fac-ie that do not modify the status are processed, whereupon the status-modifying performance feature control element x-fac-ie indicated by the separate pointer X-PT is forwarded to the executive sub-program structure EXEC, whereby a status modification with respect to the switching technology is also effected by the appertaining processing routine VR.

Alternatively, there is the possibility of adapting the processing routines VR and the signalling of the performance features such that the status-modifying performance feature control elements x-fac-ie are processed before all elements n-fac-ie that do not modify the status.

After further-processing of the last performance feature control element fac-ie, the program structure FAM for processing performance-feature-related messages na is reset for searching the next performance-feature-related message na.

The invention is not limited to the particular details of the method and apparatus depicted and other modifications and applications are contemplated. Certain other changes may be made in the above described method and apparatus without departing from the true spirit and scope of the invention herein involved. It is intended, therefore, that the subject matter in the above depiction shall be interpreted as illustrative and not in a limiting sense.

What is claimed is:

1. A method for evaluating performance-feature-related messages to be processed within program-controlled communication equipment, comprising the steps of:

provinding performance-feature-related messages that are capable of having a selectable plurality of performance feature control elements embedded in performance feature control sequences;

searching the performance-feature-related messages for performance feature control sequences;

determining a sequence of evaluating the embedded performance feature control elements after locating of performance feature control sequences such that a distinction I is made between elements that modify switching-oriented status of the communication equipment controlling the performance features and elements that leave the switching-oriented status unmodified; and implementing in groups processing routines respectively allocated to the performance feature control elements according to this distinction for control of performance features.

2. The method according to claim 1, wherein the allocation of the processing routines to the corresponding performance feature control elements ensues via an allocation table.

3. The method according to claim 1, wherein only one performance feature control element that modifies the switching-oriented status is further processed per performance-feature-related message.

4. The method according to claim 3, wherein the performance feature control element that modifies the switching-oriented status is processed as a last performance feature control element of a performance-feature-related message.

5. The method according to claim 1, wherein each of the performance feature control elements have an operational code with particulars about element length and appertaining parameters thereof, and wherein the performance feature control elements are distinguished on the basis of their operation code.

6. The method according to claim 1, wherein, when performance feature control sequences are found in performance-feature-related messages, a sequence pointer is set to a beginning of the performance feature control sequences and an element pointer is set to a beginning of a first performance feature control element, whereby the element pointer is respectively set during further processing to a next performance feature control element to be processed.

7. The method according to claim 1, wherein, when a first performance feature control element that modifies the switching-oriented status is found, a separate pointer is set to an address thereof.

8. The method according to claim 1, wherein the method is initiated after a reception of performance-feature-related messages in a switching unit of the program-controlled communications equipment.

9. The method according to claim 1, wherein the method is initiated after reception of performance-feature-related messages in a periphery controller of the program-controlled communications equipment.

10. A program structure within program-controlled communication equipment for evaluation of performance-feature-related messages, said performance-feature-related messages being capable of having a selectable plurality of performance feature control elements embedded in performance feature control sequences comprising:

an evaluation sub-program structure for searching the performance-feature-related messages for performance feature control sequences and for determining a sequence for further processing of performance feature control elements that are found; and an executive sub-program structure for calling processing routines allocated to the performance feature control elements for control of performance features.

11. The program structure according to claim 10, wherein the structure further comprises an allocation table for allocating the processing routines to corresponding performance feature control elements.

12. The program structure according to claim 10, wherein the evaluation sub-program structure is structured such that, in the determination of the sequence of the evaluation, the performance feature control elements are divided into elements that modify the switching-oriented status of the communication equipment controlling the performance features and into elements that leave the status unmodified and are further-processed in groups, and wherein only one status-modifying performance feature control element is further processed per performance-feature-related message.

13. The program structure according to claim 10, wherein each of the performance features control elements have operational code with particulars about element length and appertaining parameters thereof, and wherein the evaluation sub-program structure is structured such that the performance feature control elements are distinguished onto the basis of their operation code and, further, particulars about their element length and the appertaining parameters are evaluated.

14. The program structure according to claim 10, wherein the evaluation sub-program structure is structured such that, when performance feature control sequences are found in performance-feature-related messages, a sequence pointer is set to a beginning of the performance feature control sequence and an element pointer is set to a beginning of a first performance feature control element, whereby the element pointer is respectively set during further processing to a next performance feature control element to be processed.

15. The program structure according to claim 14, wherein evaluation sub-program structure is structured such that, when the first status-modifying performance feature control element is found, a separate pointer is set to an address thereof.

16. A method for evaluating performance-feature-related messages to be processed within program-controlled communication equipment, comprising the step of:

providing performance-feature-related messages that are capable of having a selectable plurality of performance feature control elements embedded in performance feature control sequences;

searching the performance-feature-related messages for performance feature control sequences;

determining a performance feature control sequence of evaluating the embedded performance feature control elements such that a distinction is made between elements that modify switching-oriented status of the communication equipment controlling the performance features and elements that leave the switching-oriented status unmodified;

setting a sequence pointer to a beginning of the performance feature control sequence and setting an element pointer to a beginning of a first performance feature control element in the sequence, whereby the element pointer is respectively set during further processing to a next performance feature control element to be processed; and implementing in groups processing routines respectively allocated to the performance feature control elements according to this distinction control of performance features.

17. The method according to claim 16, wherein the allocation of the processing routines to the corresponding performance feature control elements ensues via an allocation table.

18. The method according to claim 16, wherein only one performance feature control element that modifies the switching-oriented status is further processed per performance-feature-related message.

19. The method according to claim 16, wherein the performance feature control element that modifies the switching-oriented status is processed as a last performance feature control element of a performance-feature-related message.

20. The method according to claim 16, wherein each of the performance feature control elements have an operational code with particulars about element length and appertaining parameters thereof, and wherein the performance feature control elements are distinguished on the basis of their operation code.

* * * * *